(12) United States Patent
Yan

(10) Patent No.: US 12,014,216 B2
(45) Date of Patent: Jun. 18, 2024

(54) METHOD FOR PLATFORM-BASED SCHEDULING OF JOB FLOW

(71) Applicant: Beijing Huayun Shinetek Technologies Co., Ltd., Beijing (CN)

(72) Inventor: Junjie Yan, Beijing (CN)

(73) Assignee: Beijing Huayun Shinetek Technologies Co., Ltd., Beijing (CN)

( * ) Notice: Subject to any disclaimer, the term of this patent is extended or adjusted under 35 U.S.C. 154(b) by 454 days.

(21) Appl. No.: 17/408,401

(22) Filed: Aug. 21, 2021

(65) Prior Publication Data

US 2022/0179711 A1 Jun. 9, 2022

(30) Foreign Application Priority Data

Dec. 8, 2020 (CN) .......................... 202011421755.0

(51) Int. Cl.
*G06F 9/50* (2006.01)
*G06F 9/48* (2006.01)
*G06F 9/54* (2006.01)
*G06F 11/07* (2006.01)
*G06F 16/2458* (2019.01)

(52) U.S. Cl.
CPC .......... *G06F 9/5038* (2013.01); *G06F 9/4881* (2013.01); *G06F 9/5077* (2013.01); *G06F 9/542* (2013.01); *G06F 11/0793* (2013.01); *G06F 16/2474* (2019.01); *G06F 2209/481* (2013.01); *G06F 2209/5021* (2013.01); *G06F 2209/507* (2013.01); *G06F 2209/508* (2013.01)

(58) Field of Classification Search
CPC .......... G06F 16/2474; G06F 2209/481; G06F 2209/5021; G06F 2209/507; G06F 2209/508; G06F 2209/484; G06F 2209/548; G06F 11/0751; H04B 7/18513; G01W 1/00
See application file for complete search history.

(56) References Cited

U.S. PATENT DOCUMENTS

2003/0016166 A1* 1/2003 Jandrell ................ G01S 19/235
342/357.64
2003/0172104 A1* 9/2003 Hooman ............... G06F 9/4881
718/103

(Continued)

*Primary Examiner* — Tuan C Dao
(74) *Attorney, Agent, or Firm* — Harness, Dickey & Pierce, P.L.C.

(57) ABSTRACT

A method for a platform-based scheduling of a job flow is provided, which relates to the technology field of satellites. Specifically, the method includes: acquiring satellite remote sensing data according to transit time of a satellite and triggering a processing flow of the satellite remote sensing data; determining an execution order of the processing flow of the satellite remote sensing data according to a constraint relationship; and allocating processing resources to the processing flow in a hierarchical scheduling manner according to the execution order, and executing the processing flow with the processing resources. Due to a reasonable determination of the execution order of the processing flow of the satellite remote sensing data and a scheduling of the processing resources in the hierarchical scheduling manner, a reasonable allocation of the processing resources is realized. Thus, A timeliness of the processing of the satellite remote sensing data may be improved.

15 Claims, 6 Drawing Sheets

(56) References Cited

U.S. PATENT DOCUMENTS

| | | | | |
|---|---|---|---|---|
| 2005/0114022 | A1* | 5/2005 | Podshivalov | G01S 19/05 342/357.23 |
| 2005/0146462 | A1* | 7/2005 | Abraham | G01S 19/05 342/357.62 |
| 2011/0013644 | A1* | 1/2011 | Das | H04L 47/724 370/458 |
| 2014/0243013 | A1* | 8/2014 | Liu | G01S 5/0278 455/456.1 |
| 2015/0379072 | A1* | 12/2015 | Dirac | G06N 20/00 707/693 |
| 2015/0379424 | A1* | 12/2015 | Dirac | G06N 20/00 706/12 |
| 2015/0379426 | A1* | 12/2015 | Steele | G06N 5/025 706/12 |
| 2017/0098261 | A1* | 4/2017 | Chandraghatgi | G06Q 30/0611 |
| 2019/0005262 | A1* | 1/2019 | Surla | H04L 9/0662 |
| 2019/0058522 | A1* | 2/2019 | Haley | H04B 7/18532 |
| 2020/0159540 | A1* | 5/2020 | Oidate | G06F 9/3004 |

\* cited by examiner

METHOD FOR PLATFORM-BASED SCHEDULING OF JOB FLOW

CROSS REFERENCE TO RELATED APPLICATION

This patent application claims the benefit and priority of Chinese Patent Application No. 202011421755.0 filed on Dec. 8, 2020, the disclosure of which is incorporated by reference herein in its entirety as part of the present application.

TECHNICAL FIELD

The present disclosure relates to the technical field of satellite data processing, and more specifically, to a method for a platform-based scheduling of a job flow.

BACKGROUND

Because an influence of environmental meteorological factors on production, construction and equipment operation is more and more obvious, an application of satellite remote sensing data, such as meteorological data, is more and more extensive.

In addition, with a continuous development of a computer technology, a user's demand for a timeliness of a meteorological service is constantly improved. Since the meteorological service is based on a processing of remote sensing data, how to quickly schedule processing resources of various remote sensing data, to guarantee the timeliness of the processing of the remote sensing data and a service quality of the meteorological service, becomes a technical problem to be solved urgently.

It should be noted that the information disclosed in this background art is only for enhancing the understanding of the background of the present disclosure, and thus may include information that does not constitute the conventional art known to those ordinary skilled in the art.

SUMMARY

The purpose of the present disclosure is to provide a method, an apparatus, an electronic device and a computer-readable storage medium for a platform-based scheduling of a job flow, which may improve the timeliness of the processing of the satellite remote sensing data, and the service quality of satellite services when the satellite remote sensing data are used for the meteorological service.

Other features and advantages of the present disclosure will be apparent from the following detailed description, or in part learned by practice of the present disclosure.

According to one aspect of the present disclosure, the method for a platform-based scheduling of a job flow is provided. The method includes acquiring satellite remote sensing data according to transit time of a satellite, and triggering a processing flow of the satellite remote sensing data; determining an execution order of the processing flow of the satellite remote sensing data according to a constraint relationship; and allocating processing resources to the processing flow in a hierarchical scheduling manner according to the execution order, and executing the processing flow with the processing resources.

In one embodiment of the present disclosure, the step of determining the execution order of the processing flow of the satellite remote sensing data according to the constraint relationship includes: parsing the processing flow into jobs conforming to a job interface standard according to the constraint relationship; submitting the jobs to different execution queues, the execution queues being arranged according to an execution priority; and determining the execution order according to the execution priority.

In an embodiment of the present disclosure, the step of allocating the processing resources to the processing flow in the hierarchical scheduling manner according to the execution order and executing the processing flow with the processing resources includes: generating a resource request for each of the jobs according to the execution order; sending an application request to a resource manager in response to the resource request; selecting, by the resource manager, a corresponding target container from the execution queues in the hierarchical scheduling manner according to the application request, the target container including nodes of the processing resources; and calling the processing resources to process the job according to the nodes.

In one embodiment of the present disclosure, the step of selecting, by the resource manager, the corresponding target container from the execution queues in the hierarchical scheduling manner according to the application request includes: selecting an execution queue at a first layer with a depth first traversal algorithm based on a priority; sorting applications in the execution queue at a second layer according to a priority order after the execution queue is selected, and sequentially traversing the sorted applications to determine an application matching the job; and selecting the target container at a third layer according to the priority order and a localization order after the application matching with the job is determined.

In an embodiment of the present disclosure, the step of calling the processing resources to process the job according to the nodes includes: adding backup resources of the job according to a resource guarantee mechanism and/or a resource preemption mechanism when the processing resources are detected unable to meet processing requirements of the job.

In one embodiment of the present disclosure, the step of calling the processing resources to process the job according to the nodes further includes: connecting a monitoring system via an REST interface to monitor a processing of the job; and triggering an exception fault tolerance engine to solve an exception when the exception is detected during the processing of the job, so as to end the job or restart the job.

In an embodiment of the present disclosure, the step of allocating the processing resources to the processing flow in the hierarchical scheduling manner according to the execution order and executing the processing flow with the processing resources includes: connecting a lower-level scheduling system in an adapter mode; and inputting the job to the lower-level scheduling system, and receiving a processing result of the job from the lower-level scheduling system.

In an embodiment of the present disclosure, the step of allocating the processing resources to the processing flow in the hierarchical scheduling manner according to the execution order and executing the processing flow with the processing resources further includes: indirectly accessing the target container via a proxy container in a proxy mode when the target container is detected unable to be directly accessed; wherein a remote proxy mode is used in a multi-machine resource scheduling based on a native method function Native, and a smart reference proxy mode is used in case of executing an internal job node.

In an embodiment of the present disclosure, the step of allocating the processing resources to the processing flow in the hierarchical scheduling manner according to the execution order and executing the processing flow with the processing resources further includes: after one of multiple jobs is processed, a processing of a next job is triggered according to an event-driven mode.

In one embodiment of the present disclosure, the method further includes: after the processing flow is executed with the processing resources, generating a number of versions of processing data and/or a number of types of processing data based on the processing result of the satellite remote sensing data; and querying the number of versions of processing data and/or the number of types of processing data in a web page adaptive manner to manage and access the satellite remote sensing data.

According to another aspect of the present disclosure, an apparatus for a platform-based scheduling of a job flow is provided. The apparatus includes: an acquiring module, configured for acquiring satellite remote sensing data according to transit time of a satellite, and triggering a processing flow of the satellite remote sensing data; a determining module, configured for determining an execution order of the processing flow of the satellite remote sensing data according to a constraint relationship; and an allocating module, configured for allocating processing resources to the processing flow in a hierarchical scheduling manner according to the execution order, and executing the processing flow with the processing resources.

According to another aspect of the present disclosure, an electronic device is provided. The electronic device includes: a processor, and a memory configured for storing executable instructions of the processor. Wherein, the processor is configured to execute the method for the platform-based scheduling of the job flow of any one of the above by executing the executable instructions.

According to another aspect of the present disclosure, a computer-readable storage medium having a computer program stored thereon is provided. When the computer program is executed by the processor, the method for the platform-based scheduling of the job flow of any of the above is implemented.

In the method for the platform-based scheduling of the job flow provided by the embodiments of the present disclosure, satellite remote sensing data are obtained from different satellites, and a corresponding processing flow is triggered based on the satellite remote sensing data. According to the constraint relationship between different processing flows, the execution order of these flows is determined to ensure the rationality of the processing of the satellite remote sensing data, thus providing a guarantee for a rapid scheduling of the processing resources for various remote sensing data.

Further, due to a reasonable determination of the execution order of the processing flows of the satellite remote sensing data and a scheduling of the processing resources in the hierarchical scheduling manner, a reasonable allocation of the processing resources is realized. Thus, the timeliness of the processing of the satellite remote sensing data may be improved, and the service quality of the satellite service may be also improved when the satellite remote sensing data are used for the meteorological service.

It should be understood that the above general description and the following detailed description are explanatory only and are not intended to limit the present disclosure.

DRAWINGS

The accompanying drawings, which are incorporated in and constitute a part of this specification, illustrate embodiments consistent with the present disclosure, and serve to explain the principles of the present disclosure together with the description. Obviously, the accompanying drawings below are merely embodiments of the present disclosure. Other drawings may also be obtained from these drawings without any creative effort for those skilled in the art.

DETAILED DESCRIPTION

Figure 1:
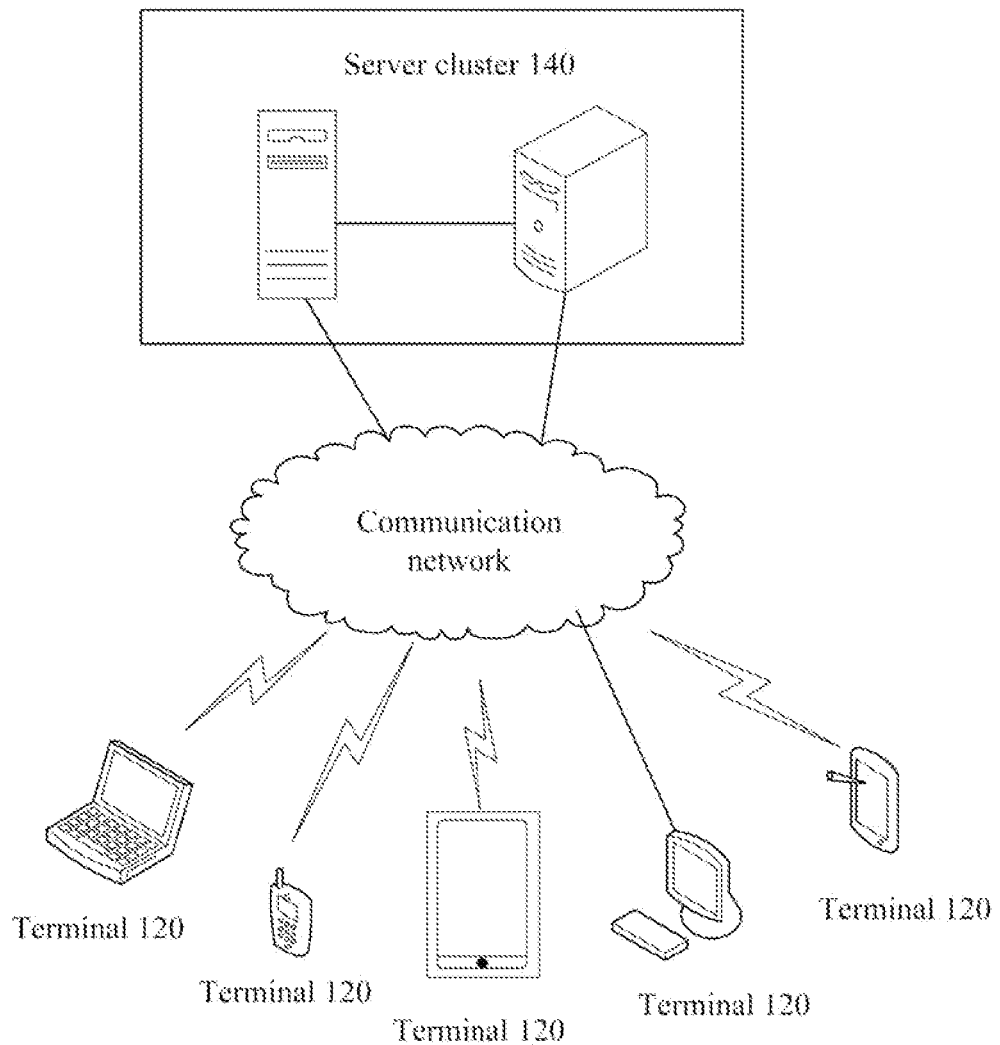
FIG. 1 is a schematic diagram showing a structure of a system for a platform-based scheduling of a job flow according to an embodiment of the present disclosure.

Embodiments will now be described more fully with reference to the accompanying drawings. However, embodiments may be implemented in various forms and should not be construed as limited to the embodiments set forth herein. These embodiments are provided for making the present disclosure more thorough and complete, and fully conveying the concepts of the embodiments to those skilled in the art. The described features, structures, or characteristics may be combined in one or more embodiments in any suitable manner.

In addition, the drawings are merely schematic illustrations of the present disclosure and are not necessarily drawn to scale. The same reference numerals in the drawings represent the same or similar parts, and thus a repetitive description thereof will be omitted. Some of the block diagrams shown in the drawings are functional entities and do not necessarily correspond to physically or logically independent entities. These functional entities may be implemented in a form of software, or in one or more hardware modules or integrated circuits, or in different networks and/or processor devices and/or microcontroller devices.

In the solution provided by the present disclosure, satellite remote sensing data are obtained from different satellites, and a corresponding processing flow is triggered based on the satellite remote sensing data. According to the constraint relationship between different processing flows, the execution order of these flows is determined to ensure the rationality of a processing of the satellite remote sensing data, thus providing a guarantee for a rapid scheduling of processing resources for various remote sensing data. Due to a reasonable determination of the execution order of the processing flow of the satellite remote sensing data and a scheduling of the processing resources in a hierarchical scheduling manner, a reasonable allocation of the processing resources is realized. Thus, the timeliness of the processing of the satellite remote sensing data may be improved, and a service quality of a satellite service may be improved when the satellite remote sensing data are used for a meteorological service.

In order to facilitate understanding, several terms related to the present application are explained below.

Remote sensing technology is a kind of detection technology developed in the 1960s and an integrated technology which uses various sensing instruments to collect and process electromagnetic wave information radiated and reflected by long-distance targets according to the electromagnetic wave theory and finally to image, so as to detect and recognize all kinds of scenery on the ground.

Remote sensing satellites are artificial satellites used as remote sensing platforms for outer space. The remote sensing technology and remote sensing satellites are used to collect meteorological and high-resolution satellite mass data, combined with an application of product algorithms, for a meteorological disaster prevention and mitigation and an ecological civilization construction.

Master/Slave structure is a master-slave structure that divides an original task into several semantically equivalent sub-tasks.

REST interface is used to specify how an application interacts data between an API provider and an HTTP layer. REST describes rules of data interaction between a client and a server at the HTTP layer. The client completes an HTTP interaction by sending an HTTP(s) request to the server and receiving a response from the server. In the course of this interaction, two important aspects specified by the REST are methods used by the HTTP request and links of the request.

The solutions provided by the embodiments of the present disclosure relate to processing technologies of the satellite remote sensing data, which are specifically explained by the following embodiments.

FIG. 1 is a schematic diagram showing a structure of a system for a platform-based scheduling of a job flow according to an embodiment of the present disclosure, including a number of terminals 120 and a server cluster 140.

The terminal 120 may be a personal computer (PC), such as a laptop computer, and a desktop computer, or a mobile terminal, such as a mobile phone, a game console, a tablet computer, an e-book reader, smart glasses, MovingPicture Experts Group Audio Layer IV (MP4) players, smart home devices, Augmented Reality (AR) devices, Virtual Reality (VR) devices, or the like.

The terminal 120 may be installed with an application for providing a platform-based scheduling of a job flow.

The terminal 120 are connected with the server cluster 140 via a communication network. Alternatively, the communication network is a wired network or a wireless network.

The server cluster 140 may be a server or composed of several servers, or the server cluster 140 is a virtualization platform or a cloud computing service center. The server cluster 140 is configured to provide background services for applications that provide the platform-based scheduling of the job flow. Wherein, the server cluster 140 is configured to perform a primary calculation work, and the terminal 120 is configured to perform a secondary calculation work. Alternatively, the server cluster 140 is configured to perform the secondary calculation work, and the terminal 120 is configured to perform the primary calculation work. Alternatively, a distributed computing architecture is arranged between the terminal 120 and the server cluster 140 for performing a cooperative calculation.

In some alternative embodiments, the server cluster 140 is configured to store information for the platform-based scheduling of the job flow, such as images to be detected, a library of reference images, and detected images.

Alternatively, clients of applications installed in different terminals 120 are the same, or the clients of applications installed in two terminals 120 are clients of the same type of applications of different control system platforms. Depending on different terminal platforms, the specific forms of the clients of the applications may also be different. For example, the client of the application may be a mobile phone client, a PC client or a World Wide Web (Web) client.

Those skilled in the art would recognize that the number of the terminals 120 may be greater or less. For example, the number of the terminals may be only one, several tens or hundreds, or more. In the embodiment of the present application, the number of terminals and the types of devices are not limited.

Optionally, the system may further include a management device (not shown in FIG. 1) that is connected to the server cluster 140 via the communication network. Optionally, the communication network may be the wired network or the wireless network.

Optionally, the wireless network or the wired network described above uses standard communication technologies and/or protocols. The network is typically the Internet, or any network including, but not limited to, a Local Area Network (LAN), a Metropolitan Area Network (MAN), a Wide Area Network (WAN), a mobile network, a wired or wireless network, a private network, a virtual private network, or any combination thereof. In some embodiments, data exchanged over a network is represented with techniques and/or formats including a HyperText Mark-up Language (HTML), an Extensible Markup Language (XML), and the like. In addition, conventional encryption techniques, such as a Secure Socket Layer (SSL), a Transport Layer Security (TLS), a Virtual Private Network (VPN), and an Internet Protocol Security (IPsec), may be used to encrypt all or some of the links. In other embodiment, customized and/or private data communication techniques may also be used in place of or in addition to that data communication techniques described above.

Each step of the method for the platform-based scheduling of the job flow according to an embodiment will be described in more detail with reference to the drawings and embodiments below.

Figure 2:
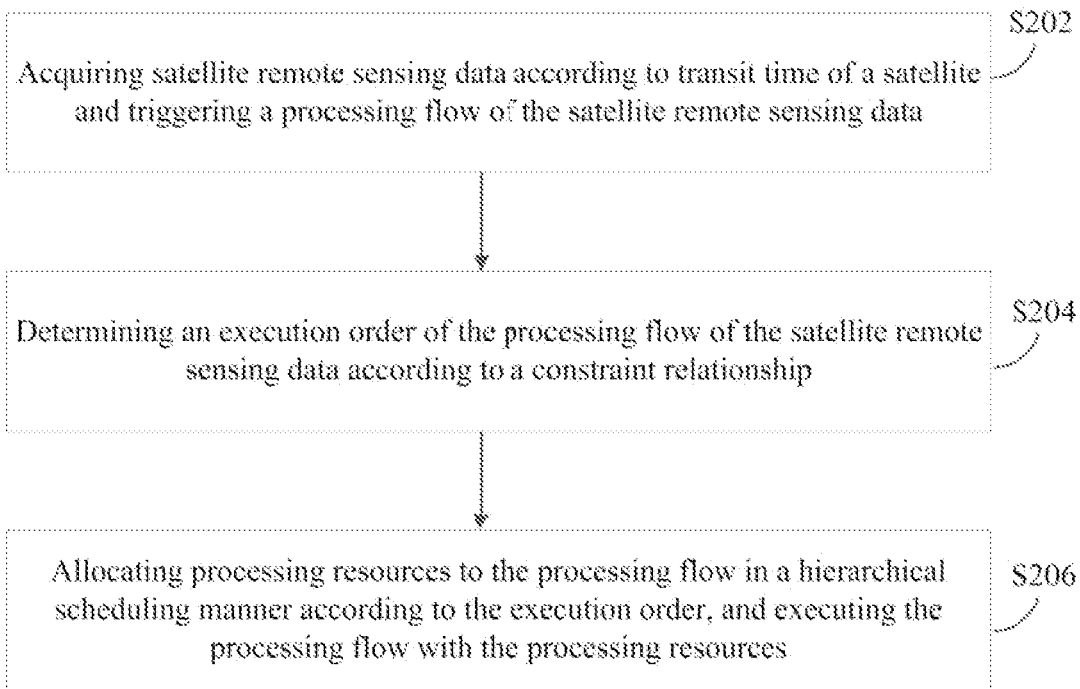
FIG. 2 is a flowchart of a method for a platform-based scheduling of a job flow according to an embodiment of the present disclosure.

FIG. 2 is a flowchart of a method for a platform-based scheduling of a job flow according to an embodiment of the present disclosure. The methods provided by embodiments of the present disclosure may be implemented by any electronic device having computing processing capabilities, such as the terminal 120 and/or the server cluster 140 in FIG. 1. In the following examples, the terminal 120 is taken as an execution subject for example explanation.

The terminal 120 is configured to perform the method for the platform-based scheduling of the job flow as shown in FIG. 2, including the following steps 202-206.

At step S202, satellite remote sensing data are acquired according to transit time of the satellite, and a processing flow of the satellite remote sensing data is triggered.

Specifically, the Fengyun (FY) satellite is taken as an example. The remote sensing data of the FY satellite is used for meteorological services. And the processing flow of the remote sensing data may include a satellite observation, a data reception, a data transmission and a data processing. A data flow of the whole process is synchronously triggered by time to be controlled precisely.

Specifically, according to the transit time of the satellite, time of arrival to the ground for the data can be accurately predicted and the processing flow of the remote sensing data can be triggered, so as to improve the timeliness of the data processing.

At step S204, the execution order of the processing flow of the satellite remote sensing data is determined according to a constraint relationship.

The constraint relationship can be understood as a restrictive relationship set among different remote sensing data processing flows in order to ensure the integrity of the data processing. The restrictive relationship includes an execution order, etc. Thus, the execution order of the processing flow of the remote sensing data can be determined based on the constraint relationship.

At step S206, the processing resources are allocated to the processing flow in a hierarchical scheduling manner according to the execution order, and the processing flow are executed with the processing resources.

The hierarchical processing includes a resource manager for managing hardware resources of the data processing and scheduling submitted jobs, and a flow manager for organizing data processing constraint relationship of business layers, to ensure that all the works are executed in order. The business layers are closely related to the remote sensing data. And the business layers are configured to arrange the time order and the flow of the data processing according to different remote sensing data, and allocate resources for data processing in combination with the resource manager, thus realizing the data processing.

In this embodiment, the satellite remote sensing data are obtained from different satellites, a corresponding processing flow is triggered based on the satellite remote sensing data, and the execution order of these flows is determined according to the constraint relationship between different processing flows, to ensure the rationality of the processing of the satellite remote sensing data, so as to provide a guarantee for a rapid scheduling of the processing resources of various remote sensing data.

Further, by reasonably determining the execution order of the processing flow of the satellite remote sensing data and scheduling the processing resources in the hierarchical scheduling manner, a reasonable allocation of the processing resources is realized. Thus, the timeliness of the processing of the satellite remote sensing data can be improved, and the service quality of satellite services can be improved when the satellite remote sensing data are used for the meteorological services.

Figure 3:
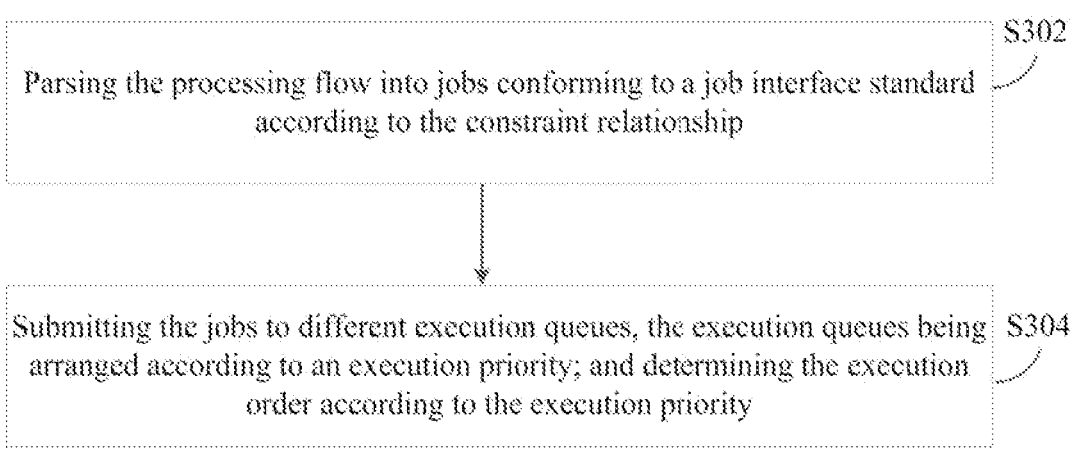
FIG. 3 is a flowchart of another method for a platform-based scheduling of a job flow according to an embodiment of the present disclosure.

As shown in FIG. 3, in an embodiment of the present disclosure, the execution order of the processing flow of the satellite remote sensing data is determined according to the constraint relationship at step S204, which includes the steps S302 and S304.

At step S302, the processing flow is parsed into jobs conforming to the job interface standard according to the constraint relationship.

Herein, by parsing the processing flow into jobs conforming to the job interface standard, the jobs can be easily transferred between different interfaces, to ensure the reliability and the timeliness of the job processing.

At step S304, the jobs are submitted to different execution queues, the execution queues are arranged according to the execution priority, and the execution order are determined according to the execution priority.

Herein, by submitting the jobs to different execution queues, generating queues according to the priority of the jobs, and determining the execution order of the jobs according to the priority, a timing parsing of the jobs is realized.

Specifically, by completing a configuration of both a graphical mode and a text mode in the user interface (UI) of the client, the user can perform a drag operation in the graphical interface, or in the form of label in the text, to realize a definition of a job time-sequence control flow.

After the definition of the job time-sequence control flow is completed, the job time-sequence control flow may be parsed and executed by an execution engine thereof. And before the job time-sequence control flow is executed, the jobs are first submitted to different execution queues. The queues are arranged according to a certain priority, such as priority, normal and last. The job with a high priority is picked and executed first by the job time-sequence control flow scheduler. The secondary job is picked after the job with the high priority is executed, until all the data processing operation is completed.

In addition, the instantiated job time-sequence control flow is parsed into independent jobs conforming to the user job interface standard according to the logical constraint relationship of the jobs. The hierarchical and distributed scheduling of a single job, and a monitoring and a controlling of the jobs during the execution of the jobs are realized in combination with the UI interface.

Figure 4:
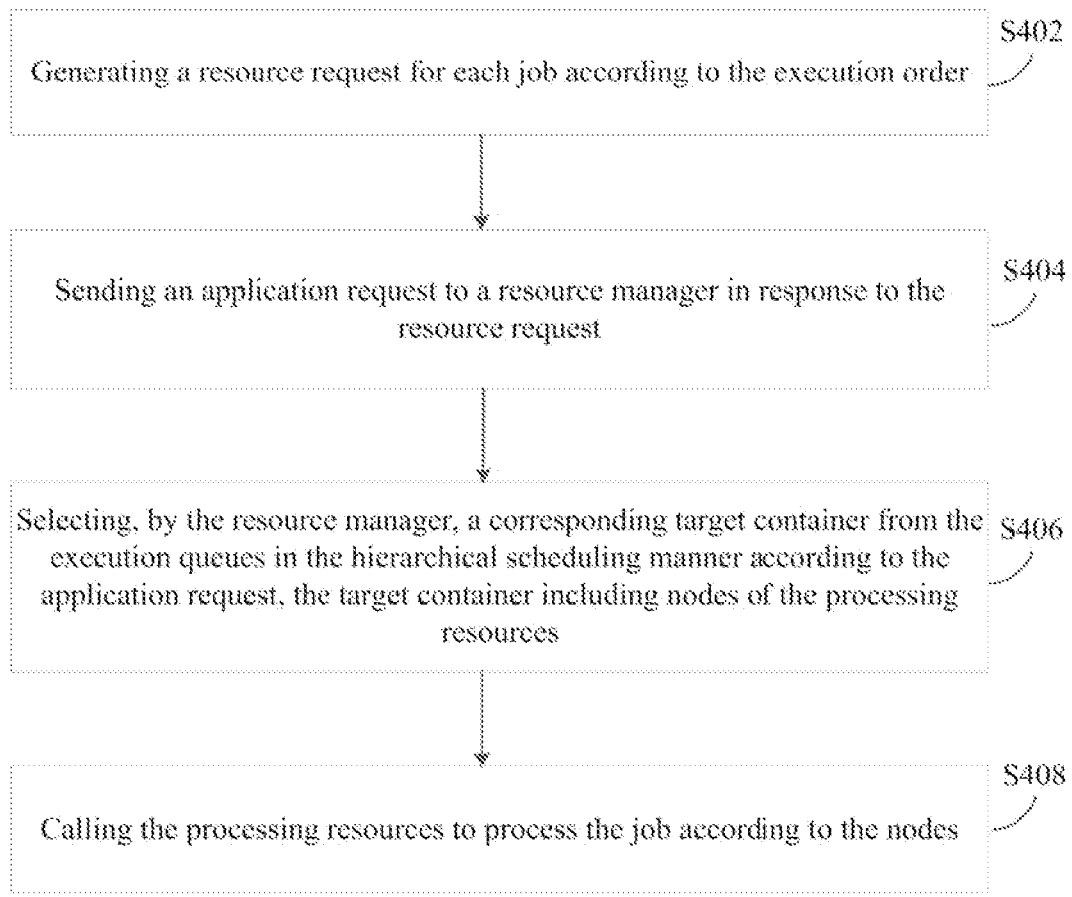
FIG. 4 is a flowchart of another method for a platform-based scheduling of a job flow according to an embodiment of the present disclosure.

As shown in FIG. 4, in an embodiment of the present disclosure, the processing resources are allocated to the processing flow in a hierarchical scheduling manner according to the execution order, and the processing flow are executed with the processing resources at step S206 includes steps S402-S406.

At step S402, a resource request for each of the jobs is generated according to the execution order.

At step S404, an application request is sent to the resource manager in response to the resource request.

At step S406, a corresponding target container is selected from the execution queues by the resource manager in the hierarchical scheduling manner according to the application request, where the target container includes nodes of the processing resources.

Figure 5:
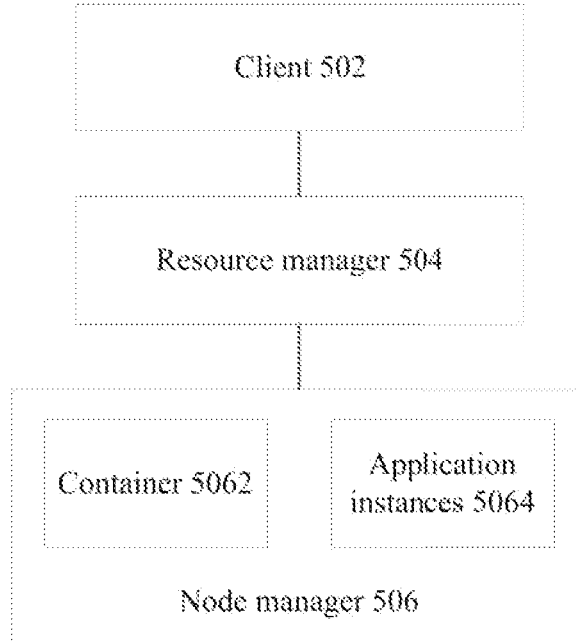
FIG. 5 is a schematic diagram showing a resource allocation scheme according to an embodiment of the present disclosure.

As shown in FIG. 5, a Master/Slave structure is adopted by the system to configure a resource allocation structure. Specifically, the client 502 sends a task to the resource manager 504. The node manager 506 registers with the resource manager 504 when it is started. And a container 5062 and application instances 5064 are generated. The registration information includes the total amount of CPU and memory that can be allocated to the node. These information are then encapsulated in the container for a subsequent resource allocation.

At step S408, the processing resources are called to process the job according to the nodes.

In particular, each container may be used to run a job. When one or more containers are received by the application manager, the container may be further allocated to a particular internal job. Once the job is determined, the application manager encapsulates the job execution environment (including execution commands, environment variables, dependent external files), together with the resource information in the container, into a container information management table object, and then communicates with the corresponding node manager to start the execution flow of the job.

When the job sends a resource request to the resource manager, the resource manager returns an object (i.e., a container) containing the resources to the job.

Figure 6:
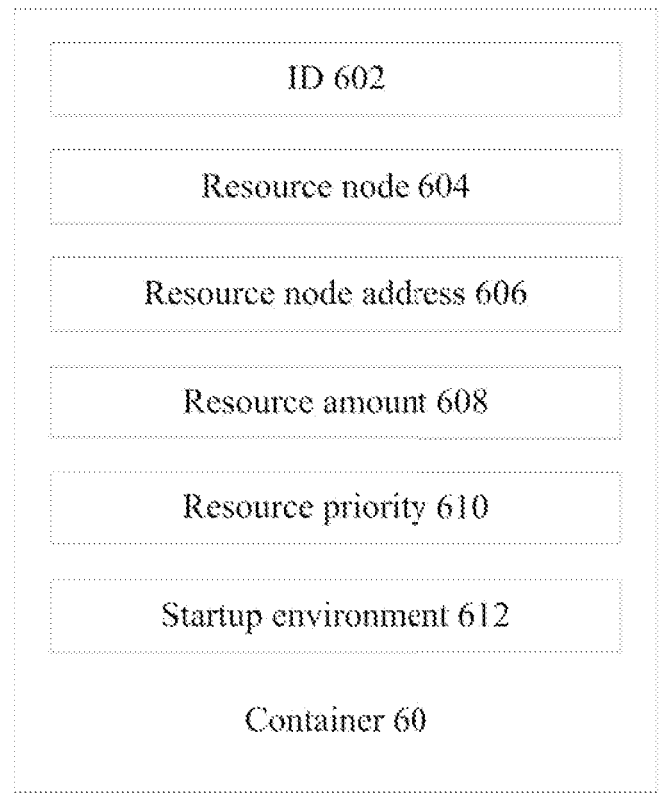
FIG. 6 is a schematic diagram showing a structure of a container according to an embodiment of the present disclosure.

The internal structure of the container is shown in FIG. 6. The elements of the container 60 include information such as an ID number 602, a resource node 604, a resource node address 606, a resource amount 608, a resource priority 610, and a startup environment 612. The information allows the job to find and make full use of the resource allocated thereto by the resource manager, so as to improve the reasonableness of the resource allocation.

In one embodiment of the present disclosure, the step of selecting the corresponding target container from the execution queues by the resource manager in the hierarchical scheduling manner according to the application request includes: selecting an execution queue at a first layer with a depth first traversal algorithm based on a priority.

Herein, the hierarchical scheduling includes three layers. When a node has idle resources, the hierarchical scheduling will select queues, applications and containers to use the resources successively.

Specifically, the first layer is used to select a queue. The depth first traversal algorithm based on a priority is used by a capacity scheduler to select a queue. Starting from the root queue, the sub-queues are traversed according to a resource utilization rate from small to large. If the sub-queue is a leaf queue, then a container is selected in the queue according to the methods of the second layer and the third layer. Otherwise, the queue is determined as a root queue and the above process is repeated until a suitable container is found so that the process exits.

After the execution queue is selected, the second layer is configured to sort the applications in the execution queue according to a priority order, and successively traverse the sorted applications to determine the applications matching with the jobs.

Specifically, the second layer is configured to select applications for processing remote sensing data. After selecting one leaf queue, the capacity scheduler sorts the applications in the leaf queue according to the priority order, and successively traverses the sorted applications to find the appropriate container.

After the application matching with the job is determined, the target container is selected at the third layer according to the priority order and a localization order.

Specifically, the third layer is configured to select containers. After an application program is determined, the containers with the high priority are first met. And the localized containers are first met in the case of the same priority, where the containers are selected in node localization, rack localization, and non-localization in order.

In this embodiment, a capacity guarantee and a configuration flexibility can be realized through the above-mentioned hierarchical scheduling manner. After the application is submitted, the resource manager sends an event to the capacity scheduler. After receiving the resource request, the capacity scheduler will temporarily store the request to wait for appropriate resources to be allocated for the request so as to improve the efficiency of remote sensing data processing.

In one embodiment of the present disclosure, the operation of calling the processing resources to execute the job according to the nodes further includes: adding processing resources of the job according to a resource guarantee mechanism and/or a resource preemption mechanism when the processing resources are detected unable to meet processing requirements of the job.

Specifically, a monitoring interface may be provided at the client to realize the parameter configuration of the server cluster management and the node manager. The monitoring interface can monitor the number of existing nodes, the total number of CPU virtual cores of the cluster management, the total size and usage of the existing cluster memory, and the size and usage of the memory managed by each of the node managers. In addition, by setting the monitoring interface, the user-defined configuration of the resource configuration file of the node manager can be realized. The configuration contents include the types of the resource allocation, the minimum allocation resource, the maximum allocation resource, and the like.

In this embodiment, by setting a response mechanism, when the resources cannot meet the task requirements temporarily or the resources are occupied by other tasks, two mechanisms, i.e., the resource guarantee and the resource preemption mechanisms, are used to guarantee the resource demands of the tasks.

In one embodiment of the present disclosure, the operation of calling the processing resources to process the job according to the nodes further includes: connecting the monitoring system via the REST interface to monitor the processing of the job; and triggering an exception fault tolerance engine to solve an exception when the exception is detected during the processing of the job, so as to end the job or restart the job.

In this embodiment, the job time-sequence monitoring process includes the following steps. With respect to the jobs in the job time-sequence control flow, the job is kept flowing in various events or dependency control triggering of a task execution result, and the connection between the REST interface and the monitoring system is monitored. When an exception occurs, the exception fault tolerance engine will solve the problem caused by the exception and give a solution, such as ending or restarting the job flow or job. The whole process of the transference of the job flow is under the monitoring of the monitoring system, which can provide a statistical query function for the operation of the job flow.

Figure 7:
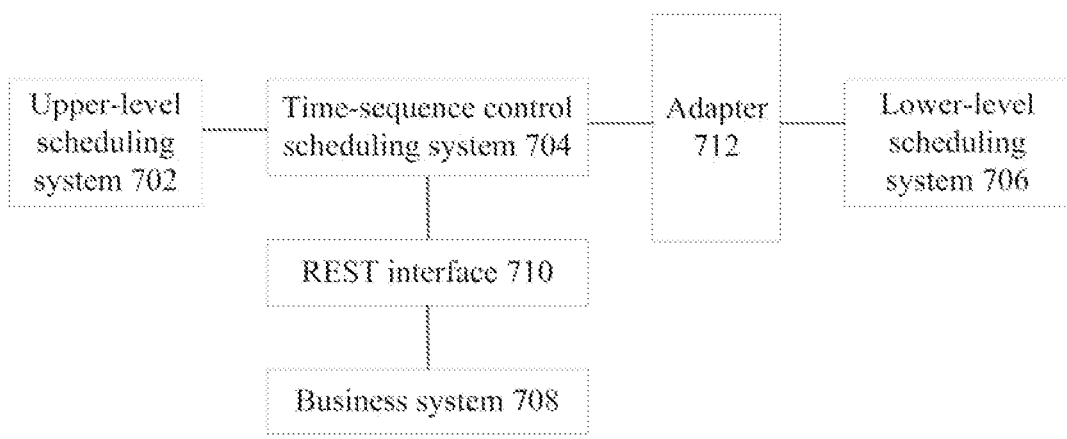
FIG. 7 is a schematic diagram showing a structure for a platform-based scheduling of a job flow according to an embodiment of the present disclosure.

As shown in FIG. 7, the scheme for a platform-based scheduling of jobs of the present disclosure includes an upper-level scheduling system 702, a time-sequence control scheduling system 704 at a current level, a lower-level scheduling system 706 and a business system 708. the business system 708 may be understood as a client. The interface between the business system 708 and the time-sequence control scheduling system 704 is the RSET interface 710, so that the monitoring of the executing of the jobs is mainly realized via the client. The function can be conveniently realized on a third-party system via the REST interface.

In one embodiment of the present disclosure, the operation of allocating the processing resources to the processing flow in a hierarchical scheduling manner according to the execution order, and executing the processing flow with the processing resources further includes: connecting the lower-level scheduling system in an adapter mode; and inputting the job to the lower-level scheduling system, and receiving a processing result of the job from the lower-level scheduling system.

As shown in FIG. 7, the time-sequence control scheduling system 704 is connected with the lower-level scheduling system 706 via an adapter 712 therebetween. The lower-level control scheduling system 704 needs to call a third-party resource scheduling system, that is, the lower-level scheduling system 706, to realize data interaction with different business systems. By using the design pattern of the adapter 712, different data can be processed by the adapter to achieve a uniform standard data output, so that the client can call the same interface, and thus it is transparent to the client, which is simpler, more direct and more compact, and makes the time-sequence control scheduling system to adapt to different business systems.

In one embodiment of the present disclosure, the operation of allocating the processing resources to the processing flow in a hierarchical scheduling manner according to the execution order, and executing the processing flow with the processing resources further includes: indirectly accessing the target container via a proxy container in a proxy mode when the target container is detected unable to be directly accessed; where a remote proxy mode is used in a multi-machine resource scheduling based on a native method function 'Native', and a smart reference proxy mode is used in case of executing the internal job node.

In this embodiment, when an object cannot be directly accessed or there is a difficulty in accessing the object, the object can be indirectly accessed via a proxy object. In order to ensure the use transparency of the client, the same interface needs to be used by the real object to be accessed and the proxy object. According to the different purposes of using the proxy modes, the proxy modes can be classified into various types, such as a protection proxy, a remote proxy, a virtual proxy, a buffer proxy, an smart reference proxy, which are applied in different scenarios to meet the different needs of users.

The time-sequence control scheduling method and device mainly use two proxy modes, i.e., the remote proxy and the smart reference proxy modes.

The remote proxy provides a local proxy object for an object located in a different address space, which may be in the same host or in another host. The remote proxy is also called an Ambassador. This design pattern is applied in the multi-machine resource scheduling based on the native method function 'Native' of the time-sequence control scheduling method and device.

The smart reference proxy provides additional operations when an object is referenced, such as recording call times of the object. This design pattern is applied when the internal job node of the time-sequence control scheduling method and device is executed.

In one embodiment of the present disclosure, in the operation of allocating the processing resources to the processing flow in a hierarchical scheduling manner according to the execution order, and executing the processing flow with the processing resources further includes: after one of multiple jobs is processed, a processing of a next job is triggered according to an event-driven mode.

In this embodiment, the basic structure of the event-driven program includes an event collector, an event transmitter, and an event processor. The event collector is specifically configured to collect all events, including those from the users (such as mouse and keyboard events), those from the hardwares (such as clock events), and those from the software (such as the operating system, the applications per se). The event transmitter is configured to distribute the events collected by the event collector into the target objects.

Specifically, after one job is completed, the processing manner for triggering the job transference downward is designed by using the event-driven mode. When one job is completed, a corresponding log record will be generated locally. The log is monitored in real time by the time-sequence control scheduling method and device. And the data are extracted and processed in case of changes, so that the transference of the job nodes can be carried out efficiently and in near real time.

In one embodiment of the present disclosure, after the operation of executing the processing flow with the processing resources, the method further includes: generating a plurality of versions of processing data and/or a plurality of types of processing data based on the processing result of the satellite remote sensing data; and querying the plurality of versions of processing data and/or the plurality of types of processing data in a web page adaptive manner to manage and access the satellite remote sensing data.

In one embodiment of the present disclosure, a plurality of standardized remote sensing data after a standardized processing are classified into data of different types and versions, are uniformly stored, managed and accessed, and are queried in a web page adaptive manner, which can effectively manage and access the remote sensing data.

The FY satellite scheduling system is a real-time business system, which has complex ground application components, and complex data processing flow. Mutual constraint relations exist therebetween when different satellites and different loads work in parallel. The parallel scheduling of multi-satellite, multi-load data processing and multi-station data receiving is realized by reasonably arranging the flow constraint relations.

Figure 8:
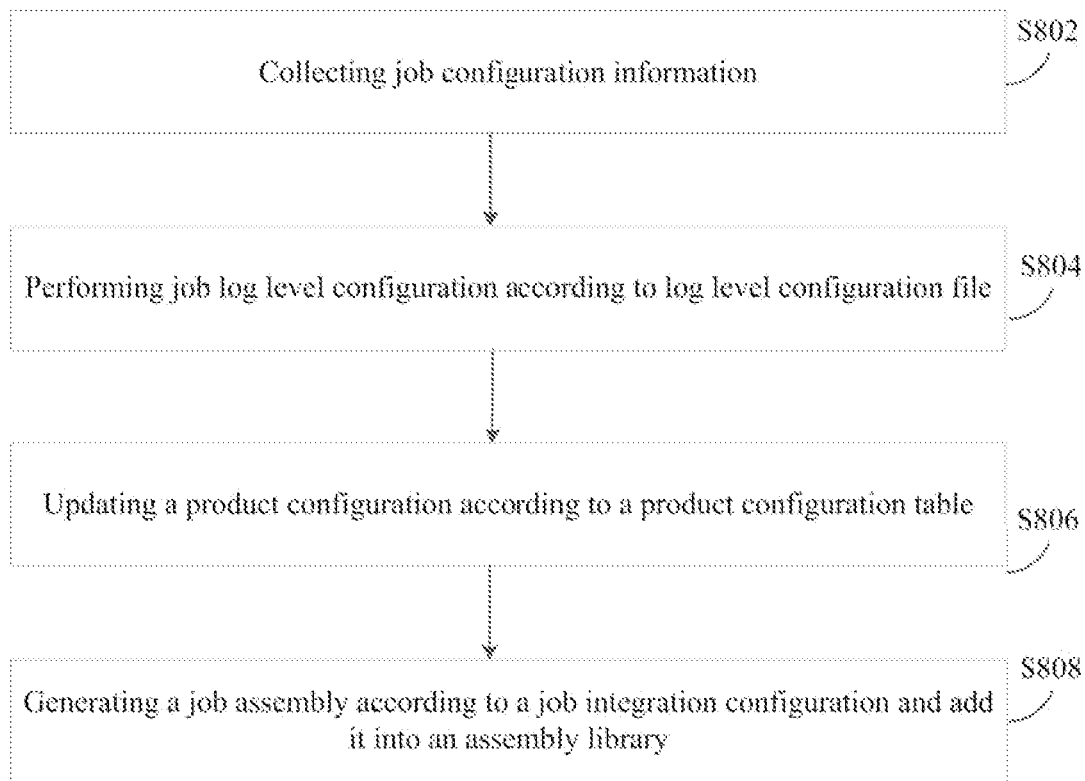
FIG. 8 is a flowchart of job flow online configuration according to an embodiment of the present disclosure.

FIG. 8 shows a flowchart of job online configuration.

As shown in FIG. 8, the processing flow of the job online configuration includes steps S802-S808.

At step S802, the job configuration information is collected.

In particular, job integration information is collected via the interfaces. Via the interface, the star mark, the load, the system and other basic information are selected, a relevant integration sheet is imported, modified and supplemented by the user, and stored as job integration configuration file, and the job integration information can also be collected by loading an existing job integration configuration file. For the imported and changed integration sheet, the modified information is color-marked.

At step S804, the job log level configuration is performed according to the log level configuration file.

At step S806, a product configuration is updated according to a product configuration table.

Specifically, the product configuration table includes a product ID, a product name, a product path, a product Chinese name, a business product flag, a distribution flag, an intermediate product flag, and a job ID. The product ID is used as the primary key to uniquely identify the product, and the job ID is used as an external key to associate the job table.

In addition, an intermediate file verification and error correction function can be added to appropriately correct a problem of regarding the intermediate product as a business distribution product.

At step S808, a job assembly is generated according to the job integration configuration, and is added into the assembly library.

Specifically, the job assembly functions as a job template editing. Specifically, the job template is edited according to the latest assembly library, to support the automatic update function of the assembly of the job template.

It should be noted that the above-described drawings are merely schematic illustrations of processes included in the method according to exemplary embodiments of the present disclosure and are not intended to be limited. It is easy to understand that the processes illustrated in the above drawings do not represent or limit the execution order of these processes. In addition, it is also easy to understand that these processes may be performed, for example, synchronously or asynchronously in a number of modules.

Those skilled in the art would understand that various aspects of the present disclosure may be implemented as systems, methods, or program products. Accordingly, various aspects of the present disclosure may be embodied in the form of a full hardware implementation, a full software implementation (including firmware, microcode, etc.), or an implementation combining hardware and software, which may be collectively referred to herein as "circuits", "modules", or "systems".

Figure 9:
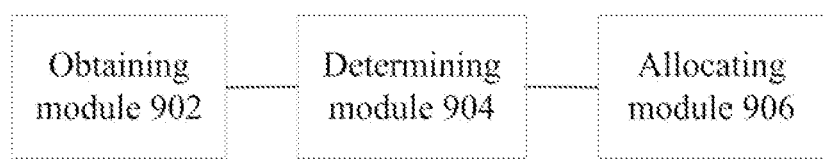
FIG. 9 is a schematic diagram showing an apparatus for a platform-based scheduling of a job flow according to an embodiment of the disclosure.

The apparatus for a platform-based scheduling of jobs 900 according to the embodiment of the present disclosure is described below with reference to FIG. 9. The apparatus for the platform-based scheduling of jobs 900 shown in FIG. 9 is only an example, and does not intend to limit the functions and the use scope of the embodiment of the present disclosure.

The apparatus for the platform-based scheduling of jobs 900 is presented in a form of hardware modules. The components of the apparatus for the platform-based scheduling of jobs 900 may include, but are not limited to, an obtaining module 902, configured to acquire satellite remote sensing data according to transit time of a satellite, and trigger a processing flow of the satellite remote sensing data; a determining module 904, configured to determine the execution order of the processing flow of the satellite remote sensing data according to the constraint relationship; and an allocating module 906, configured to allocate processing resources to the processing flow in a hierarchical scheduling manner according to the execution order, and to execute the processing flow with the processing resources.

An electronic device 1000 according to such an embodiment of the present disclosure is described below with reference to FIG. 10. The electronic device 1000 shown in FIG. 10 is merely an example, and does not intend to limit the function and the use scope of the embodiment of the present disclosure.

Figure 10:
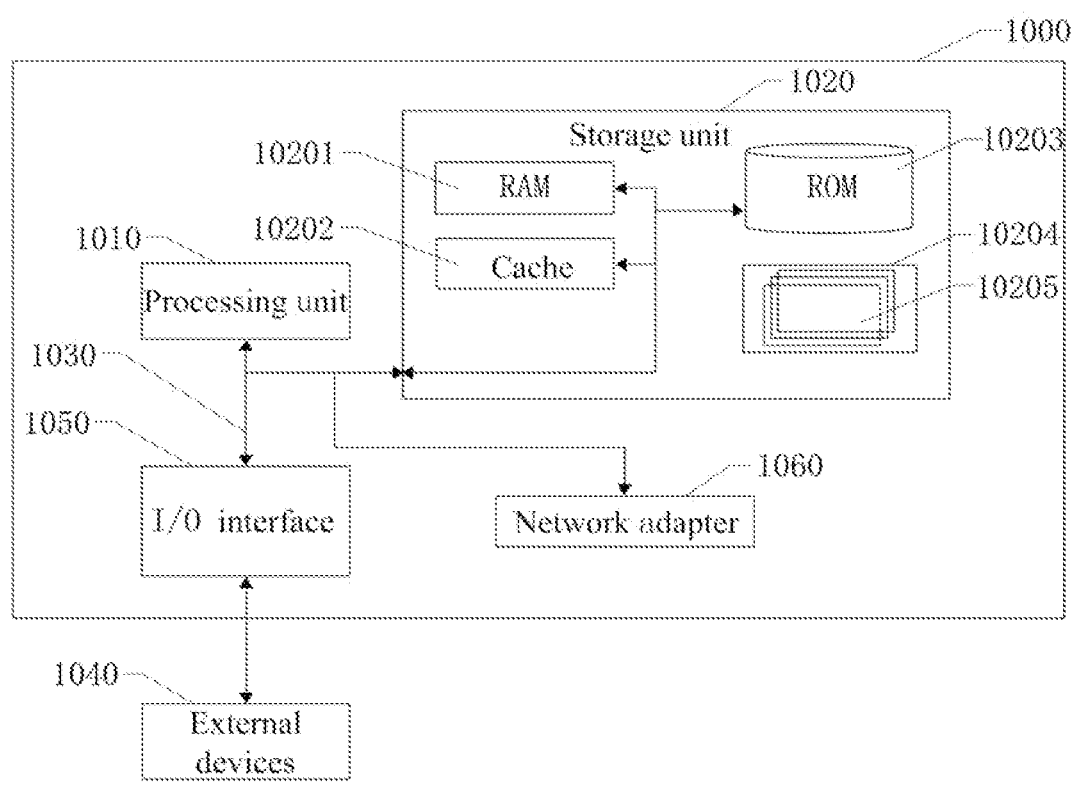
FIG. 10 is a schematic diagram showing an electronic device according to an embodiment of the present disclosure.

As shown in FIG. 10, the electronic device 1000 is presented in a form of a general purpose computing device. The components of the electronic device 1000 may include, but are not limited to, at least one processing unit 1010, at least one storage unit 1020, and a bus 1030 connecting different system components (including the storage unit 1020 and the processing unit 1010).

The storage unit stores program codes that may be executed by the processing unit 1010, such that the processing unit 1010 may implement the steps in accordance with various exemplary embodiments of the present disclosure described in the exemplary method of this description. For example, the processing unit 1010 may execute steps S202, S204, and S206 as shown in FIG. 2, as well as other steps defined in the method for the platform-based scheduling of jobs of the present disclosure.

The storage unit 1020 may include a readable medium in the form of a volatile storage unit, such as a random access memory (RAM) 10201 and/or a cache storage unit 10202, and may further include a read only memory (ROM) 10203.

The storage unit 1020 may also include a program/practical tool 10204 having a (at least one) set of program modules 10205. Such program modules 10205 include, but are not limited to, an operating system, one or more applications, other program modules, and program data. And each or some combinations of these examples may include implementation of a network environment.

The bus 1030 may represent one or more of several types of bus structures, which include a storage unit bus or storage unit controller, a peripheral bus, a graphics acceleration port, a processing unit, or a local bus using any of various bus structures.

The electronic device 1000 may also communicate with one or more external devices 1040 (e.g., keyboards, pointing devices, bluetooth devices, etc.), and may also communicate with one or more devices that enable a user to interact with the electronic device, and/or communicate with any device (e.g., a router, or a modem) that enables the electronic device 1000 to communicate with one or more other computing devices. Such communications may be performed via an input/output (I/O) interface 1050. In addition, the electronic device 1000 may also communicate with one or more networks (such as a local area network (LAN), a wide area network (WAN), and/or a public network, such as the Internet) via a network adapter 1060. As shown, the network adapter 1060 communicates with other modules of the electronic device 1000 via the bus 1030. It should be understood that although not shown in the figures, other hardware and/or software modules may be used in conjunction with the electronic device, which includes but not limited to microcode, device drives, redundant processing units, external disk drive arrays, RAID systems, tape drives, and data backup storage systems.

From the above description of the embodiments, those skilled in the art will readily understand that the example embodiments described herein may be implemented by software, or in combination with necessary hardware. Hence, the technical solutions according to the embodiments of the present disclosure may be embodied in a form of a software product that may be stored on a non-volatile memory (which may be a CD-ROM, a USB disk, a mobile hard disk or the like) or on a network, and may include several instructions to cause a compute device (which may be a personal computer, a server, a terminal device, or a network device, etc.) to perform the methods according to the embodiments of the present disclosure.

In an exemplary embodiment of the present disclosure, there is also provided a computer-readable storage medium having stored thereon a program product capable of implementing the above-described methods of the present description. In some possible embodiments, aspects of the present disclosure may also be implemented in a form of a program product including program codes. When the program product is run on a terminal device, the program codes cause the terminal device to implement the steps in accordance with various exemplary embodiments of the present disclosure described in the exemplary methods of this description.

The program product for implementing the above method according to an embodiment of the present invention may be a portable Compact Disc Read-Only Memory (CD-ROM) including program codes and run on a terminal device, such as a personal computer. However, the program product of the present invention is not limited thereto, the readable storage medium herein may be any tangible medium containing or storing programs which may be used by or in conjunction with an instruction execution system, apparatus, or device.

The computer-readable signal medium may include data signals propagated in the baseband or as part of carrier waves and carrying readable program codes. Such propagated data signals may take a variety of forms including, but not limited to, electromagnetic signals, optical signals, or any suitable combination thereof. The readable signal medium may also be any readable medium other than a readable storage medium. The readable medium may send, propagate, or transmit programs used by or in connection with the instruction execution system, apparatus, or device.

The program codes contained on the readable medium may be transmitted using any suitable medium, including but not limited to, a wireless, a wireline, a optic cable, an RF, or any suitable combination thereof.

Program codes for performing the operations of the present disclosure may be written in any combination of one or more programming languages, including object-oriented programming languages such as java, c++, and conventional procedural programming languages such as the 'C' language or similar programming languages. The program codes may be executed entirely on the user computing device, partially on the user device, as a separated software package, partially on the user computing device and partially on the remote computing device, or entirely on the remote computing device or server. In the case of a remote computing device, the remote computing device may be connected to the user computing device via any network, including a local area network (LAN) or a wide area network (WAN), or may be connected to an external computing device (e.g., using an internet service provider to connect via the internet).

It should be noted that although several modules or units of the device for action execution are mentioned in the above detailed description, this division is not mandatory. In fact, according to embodiments of the present disclosure, the features and functions of the two or more modules or units described above may be embodied in one module or unit. Conversely, the features and functions of one module or unit described above may be further divided into being embodied by a number of modules or units.

In addition, although steps of the method of the present disclosure are described in the figures in a particular order, but it does not mean or imply that the steps must be performed in that particular order, or all of the steps need to be performed to achieve a desired result. Additionally or alternatively, certain steps may be omitted, multiple steps may be combined into one step to be executed, and/or one step may be divided into multiple steps to be executed.

From the above description of the embodiments, those skilled in the art will readily understand that the example embodiments described herein may be implemented by software, or in combination with necessary hardware. Hence, the technical solution according to the embodiments of the present disclosure may be embodied in a form of a software product that may be stored on a non-volatile memory (which may be a CD-ROM, a USB disk, a mobile hard disk or the like) or on a network, and may include several instructions to cause a compute device (which may be a personal computer, a server, a mobile terminal, or a network device, etc.) to perform the methods according to the embodiments of the present disclosure.

Other embodiments of the present disclosure will be readily conceived of to those skilled in the art upon consideration of the description and the practice of the present disclosure disclosed herein. This present disclosure is intended to cover any variations, uses or adaptations of the present disclosure. These variations, uses, or adaptations follow the general principles of the present disclosure and include common knowledge or conventional techniques in the art that are not disclosed in the present disclosure. The description and embodiments are considered exemplary only, with the true scope and spirit of the present disclosure being indicated by the appended claims.

What is claimed is:

1. A method for a platform-based scheduling of a job flow, comprising:
    acquiring satellite remote sensing data according to transit time of a satellite, and triggering a processing flow of the satellite remote sensing data;
    determining an execution order of the processing flow of the satellite remote sensing data according to a constraint relationship; and
    allocating processing resources to the processing flow in a hierarchical scheduling manner according to the execution order, and executing the processing flow with the processing resources;
    wherein determining the execution order of the processing flow of the satellite remote sensing data according to the constraint relationship comprises:
        parsing the processing flow into jobs conforming to a job interface standard according to the constraint relationship;
        submitting the jobs to different execution queues, the execution queues being arranged according to an execution priority; and
        determining the execution order according to the execution priority;
    wherein allocating the processing resources to the processing flow in the hierarchical scheduling manner according to the execution order and executing the processing flow with the processing resources comprises:
        generating a resource request for each job according to the execution order;
        sending an application request to a resource manager in response to the resource request;
        selecting, by the resource manager, a corresponding target container from the execution queues in the hierarchical scheduling manner according to the application request, the target container comprising nodes of the processing resources; and
        calling the processing resources to process the job according to the nodes.

2. The method for the platform-based scheduling of the job flow of claim 1, wherein selecting, by the resource manager, the corresponding target container from the execution queues in the hierarchical scheduling manner according to the application request comprises:
    selecting an execution queue at a first layer with a depth first traversal algorithm based on a priority;
    sorting applications in the execution queue at a second layer according to a priority order after the execution queue is selected, and sequentially traversing the sorted applications to determine an application matching the job; and
    selecting the target container at a third layer according to the priority order and a localization order after the application matching with the job is determined.

3. The method for the platform-based scheduling of the job flow of claim 2, wherein after the processing flow is executed with the processing resources, further comprises:
    generating a plurality of versions of processing data and/or a plurality of types of processing data based on a processing result of the satellite remote sensing data; and
    querying the plurality of versions of processing data and/or the plurality of types of processing data in a web page adaptive manner to manage and access the satellite remote sensing data.

4. The method for the platform-based scheduling of the job flow of claim 1, wherein calling the processing resources to process the job according to the nodes comprises:
adding backup resources of the job according to a resource guarantee mechanism and/or a resource preemption mechanism when the processing resources are detected unable to meet processing requirements of the job.

5. The method for the platform-based scheduling of the job flow of claim 4, wherein after the processing flow is executed with the processing resources, further comprises:
generating a plurality of versions of processing data and/or a plurality of types of processing data based on a processing result of the satellite remote sensing data; and
querying the plurality of versions of processing data and/or the plurality of types of processing data in a web page adaptive manner to manage and access the satellite remote sensing data.

6. The method for the platform-based scheduling of the job flow of claim 1, wherein calling the processing resources to process the job according to the nodes further comprises:
connecting a monitoring system via an REST interface to monitor a processing of the job; and
triggering an exception fault tolerance engine to solve an exception when the exception is detected during the processing of the job, so as to end the job or restart the job.

7. The method for the platform-based scheduling of the job flow of claim 6, wherein after the processing flow is executed with the processing resources, further comprises:
generating a plurality of versions of processing data and/or a plurality of types of processing data based on a processing result of the satellite remote sensing data; and
querying the plurality of versions of processing data and/or the plurality of types of processing data in a web page adaptive manner to manage and access the satellite remote sensing data.

8. The method for the platform-based scheduling of the job flow of claim 1, wherein allocating the processing resources to the processing flow in the hierarchical scheduling manner according to the execution order and executing the processing flow with the processing resources comprises:
connecting a lower-level scheduling system in an adapter mode; and
inputting the job to the lower-level scheduling system, and receiving a processing result of the job from the lower-level scheduling system.

9. The method for the platform-based scheduling of the job flow of claim 8, wherein after the processing flow is executed with the processing resources, further comprises:
generating a plurality of versions of processing data and/or a plurality of types of processing data based on the processing result of the satellite remote sensing data; and
querying the plurality of versions of processing data and/or the plurality of types of processing data in a web page adaptive manner to manage and access the satellite remote sensing data.

10. The method for the platform-based scheduling of the job flow of claim 1, wherein allocating the processing resources to the processing flow in the hierarchical scheduling manner according to the execution order and executing the processing flow with the processing resources further comprises:
indirectly accessing the target container via a proxy container in a proxy mode when the target container is detected unable to be directly accessed;
wherein a remote proxy mode is used in a multi-machine resource scheduling based on a native method function Native, and a smart reference proxy mode is used in case of executing an internal job node.

11. The method for the platform-based scheduling of the job flow of claim 10, wherein after the processing flow is executed with the processing resources, further comprises:
generating a plurality of versions of processing data and/or a plurality of types of processing data based on a processing result of the satellite remote sensing data; and
querying the plurality of versions of processing data and/or the plurality of types of processing data in a web page adaptive manner to manage and access the satellite remote sensing data.

12. The method for the platform-based scheduling of the job flow of claim 1, wherein allocating the processing resources to the processing flow in the hierarchical scheduling manner according to the execution order and executing the processing flow with the processing resources further comprises:
after one of multiple jobs is processed, a processing of a next job is triggered according to an event-driven mode.

13. The method for the platform-based scheduling of the job flow of claim 12, wherein after the processing flow is executed with the processing resources, further comprises:
generating a plurality of versions of processing data and/or a plurality of types of processing data based on a processing result of the satellite remote sensing data; and
querying the plurality of versions of processing data and/or the plurality of types of processing data in a web page adaptive manner to manage and access the satellite remote sensing data.

14. The method for the platform-based scheduling of the job flow of claim 1, wherein after the processing flow is executed with the processing resources, further comprises:
generating a plurality of versions of processing data and/or a plurality of types of processing data based on a processing result of the satellite remote sensing data; and
querying the plurality of versions of processing data and/or the plurality of types of processing data in a web page adaptive manner to manage and access the satellite remote sensing data.

15. A method for a platform-based scheduling of a job flow, comprising:
acquiring satellite remote sensing data according to transit time of a satellite, and triggering a processing flow of the satellite remote sensing data;
determining an execution order of the processing flow of the satellite remote sensing data according to a constraint relationship; and
allocating processing resources to the processing flow in a hierarchical scheduling manner according to the execution order, and executing the processing flow with the processing resources,
wherein after the processing flow is executed with the processing resources, the method further comprises:
generating a plurality of versions of processing data and/or a plurality of types of processing data based on a processing result of the satellite remote sensing data; and querying the plurality of versions of processing data and/or the plurality of types of processing data in a web page adaptive manner to manage and access the satellite remote sensing data.

* * * * *